US006777704B2

(12) United States Patent
Giering

(10) Patent No.: US 6,777,704 B2
(45) Date of Patent: Aug. 17, 2004

(54) APPARATUS AND METHOD FOR EXAMINING DOCUMENTS

(75) Inventor: Thomas Giering, Kirchseeon (DE)

(73) Assignee: Giesecke & Devrient GmbH, Munich (DE)

( * ) Notice: Subject to any disclaimer, the term of this patent is extended or adjusted under 35 U.S.C. 154(b) by 9 days.

(21) Appl. No.: 10/165,275

(22) Filed: Jun. 10, 2002

(65) Prior Publication Data

US 2002/0185615 A1 Dec. 12, 2002

(30) Foreign Application Priority Data

Jun. 8, 2001 (DE) ........................................ 101 27 837

(51) Int. Cl.[7] ........................... G06K 11/00; G06K 5/00

(52) U.S. Cl. .................. 250/556; 250/208.1; 250/458.1

(58) Field of Search ............................. 250/556, 208.1, 250/214 R, 214.1, 458.1, 461.1; 340/146.2; 356/71; 382/135

(56) References Cited

U.S. PATENT DOCUMENTS 6,024,202 A * 2/2000 Potter ......................... 250/556

FOREIGN PATENT DOCUMENTS

DE 100 07 887 A1 8/2001

WO 01/61654 A2 8/2001

* cited by examiner

*Primary Examiner*—Thanh X. Luu
*Assistant Examiner*—Seung C Sohn
(74) *Attorney, Agent, or Firm*—Bacon & Thomas, PLLC

(57) ABSTRACT

An apparatus and corresponding method for examining document having at least one excitation device for exciting luminescence light in or on a document to be examined and at least two detector units for detecting at least part of the luminescence light emitted by the document. To increase the reliability of examination of the spectral characteristic of the luminescence light, it is provided that the detector units are disposed one behind the other with respect to the luminescence light emitted by the document. This causes the luminescence light to successively hit the detector units and be detected thereby. The apparatus and method permit any parallactic errors, which occur particularly with a laterally shifted arrangement of detector units, to be greatly reduced so that the detector units can detect the luminescence light emitted by a common partial spatial area of the document.

25 Claims, 2 Drawing Sheets

FIG. 4
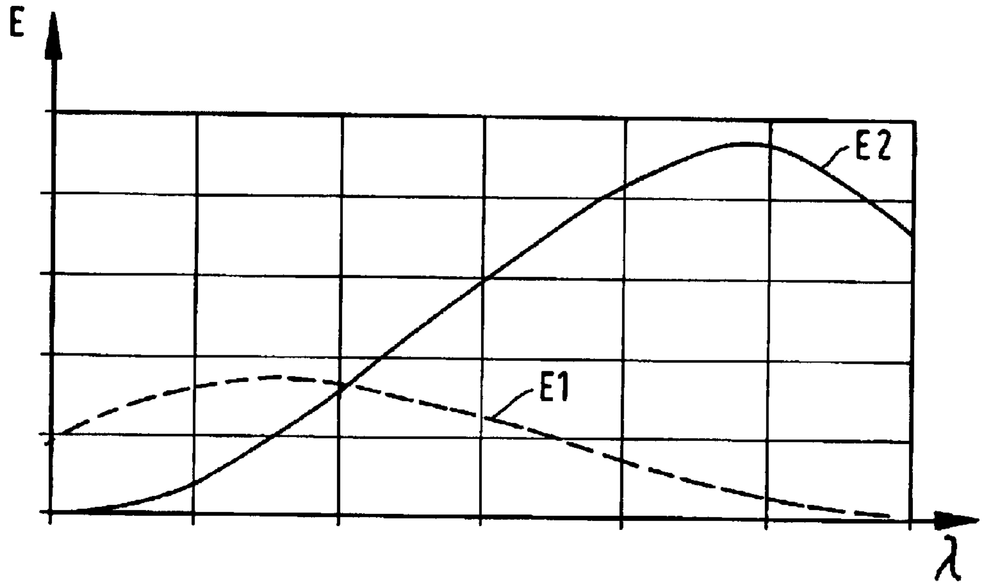
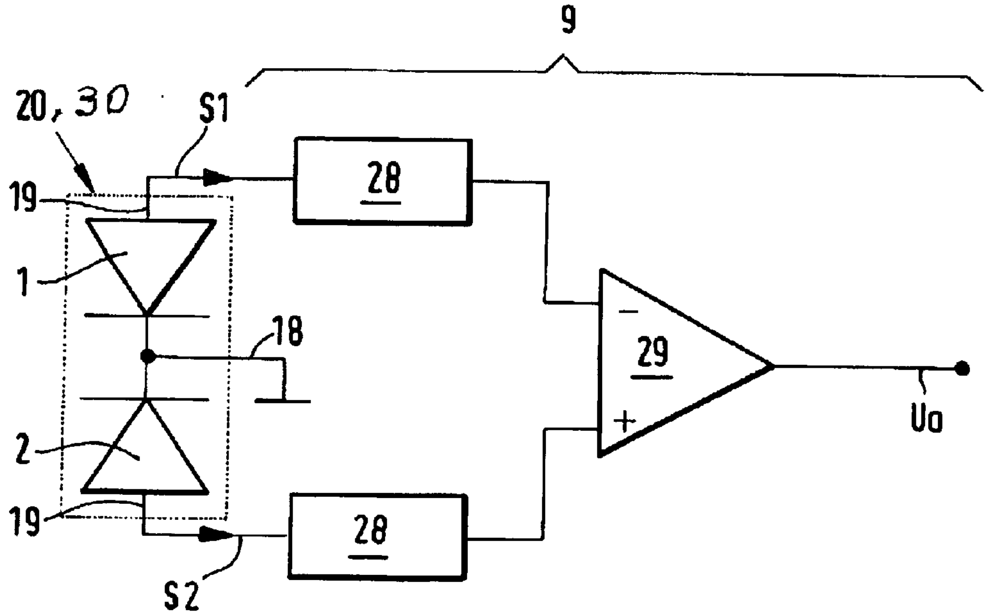
FIG. 5

APPARATUS AND METHOD FOR EXAMINING DOCUMENTS

BACKGROUND OF THE INVENTION

1. Field of the Invention

This invention relates to an apparatus for examining documents, in particular documents of value, identification or security documents, having at least one excitation device for exciting luminescence light in or on a document to be examined and at least two detector units for detecting at least part of the luminescence light emitted by the document. The invention relates in addition to a corresponding method.

2. Description of the Related Art

To increase forgery-proofness, identification or security documents or documents of value, such as bank notes, are provided with features or printed with suitable security inks containing luminescent substances. These are substances that can be excited to emit light e.g. by light, electric fields, radiation or sound. During authentication testing, the documents to be checked are usually irradiated with light of a certain spectral region and the luminescence light emitted by the luminescent substances of the document are detected. The intensity and/or spectral characteristic of the emitted luminescence light can then be used to ascertain whether the document is authentic or counterfeit.

The reliability of statements about the authenticity of checked documents is highly dependent here on the accuracy with which the spectral characteristic, i.e. color, of the luminescence light is analyzed. Such analysis can be effected for example by spectrometers, but these require relatively high technical effort and high production costs. A simpler solution is therefore to use individual detector units, such as photodiodes or photomultipliers, with different spectral sensitivity. Depending on the spectral characteristic of the luminescence light, the detector units deliver different detector signals, which can then be used for spectral analysis of the luminescence light.

Apparatuses of this type have the disadvantage, however, that the luminescence light detected by the individual detector units generally does not come from exactly the same partial spatial area of the document due to parallactic errors. This makes it impossible to reliably assess the color properties of the luminescence light emanating from a partial area of the document. This is of disadvantage in particular when partial areas with small extensions are to be examined for their luminescence properties, since in this case even small parallactic errors can lead to especially great inaccuracies in the spectral analysis of the luminescence light.

It is the problem of the invention to state an apparatus and corresponding method allowing higher reliability when examining the luminescence properties of documents, in particular documents of value, identification or security documents, while having a simple structure.

BRIEF SUMMARY OF THE INVENTION

The invention is based on the idea that the detector units are disposed one behind the other with respect to the direction of the luminescence light emitted by the document and hitting the detector units. This causes the luminescence light to successively hit the detector units disposed one behind the other and be detected thereby.

The inventive arrangement of detector units permits all detector units disposed directly one behind the other to detect the luminescence light emitted by a common partial spatial area of the document. Any parallactic errors which would occur with a laterally shifted arrangement of detector units are greatly reduced by the inventive arrangement of detector units one behind the other. Statements about the luminescence properties of the document can then be derived with high reliability from the spectral components of the luminescence light detected by the individual detector units.

In a preferred embodiment of the invention, it is provided that at least a first detector unit is permeable to that partial spectral region of luminescence light which is to be detected with at least a second detector unit disposed behind the first detector unit. A first partial spectral region of luminescence light is then detected by the first detector unit, while a second partial spectral region of luminescence light can pass through the first detector unit and is detected by the second detector unit disposed therebehind. The first detector unit acts here as an optical filter before the second detector unit detector unit therebehind. In certain applications, additional optical filters can therefore usually be dispensed with.

The detector units are preferably photodiodes which are disposed one on the other in layers, forming a so-called sandwich diode. This obtains a very compact arrangement of detector units.

The detector units can fundamentally also be elements capable of detecting light by means of other physical detection principles, e.g. by the avalanche effect.

In a further preferred embodiment of the invention, it is provided that the individual detector units are integrated on a common component, in particular a semiconductor component, that includes at least two photosensitive layers, in particular p-n junctions, one detector unit corresponding to each layer, in particular each p-n junction. The small distance between the detector units obtains an especially great reduction of parallactic errors in this embodiment.

The photodiodes or p-n junctions preferably have different absorption edges, the absorption edge of at least a first photodiode or p-n junction being at smaller wave-lengths than the absorption edge of at least a second photodiode disposed behind the first photodiode or a second p-n junction disposed behind the first p-n junction.

Especially simple and reliable derivation of statements about the spectral properties of the detected luminescence light from the detector signals generated by the individual detector units can be effected on the basis of a division of two detector signals and/or the difference of two logarithmized detector signals.

BRIEF DESCRIPTION OF THE DRAWINGS

The invention will be explained in more detail in the following with reference to examples shown in figures, in which:

FIG. 4 shows examples of spectral sensitivities of the detector units shown in FIGS. 2 and 3; and FIG. 5 shows a circuit diagram of the second embodiment of the inventively disposed detector units shown in FIG. 3.

DETAILED DESCRIPTION OF THE INVENTION

Figure 1:
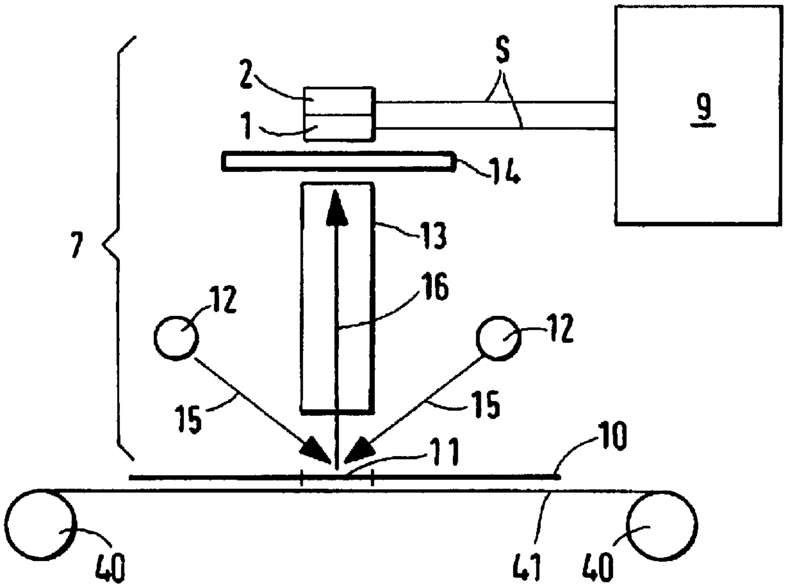
FIG. 1 shows a preferred structure of the inventive apparatus.

FIG. 1 shows a preferred structure of the inventive apparatus. A document to be examined, bank note 10 in the shown example, is transported past sensor system 7 by means of a transport device indicated by transport rollers 40 and transport belt 41. Bank note 10 is at the same time irradiated with excitation light 15 from light sources 12. Light sources 12 are for example fluorescent tubes, incandescent lamps, lasers or LEDs each emitting light suitable for exciting luminescence light in or on bank note 10. Preferably, excitation light 15 is ultraviolet (UV) light. To eliminate spectral components at higher wavelengths, for example in the visible or infrared spectral region, corresponding filters (not shown) can be disposed before light sources 12.

In the shown example, the excitation of luminescence light 16 in or on the document is effected by light 15 from light sources 12. A corresponding luminescence phenomenon is therefore referred to as photoluminescence. Alternatively or additionally, electromagnetic or electric fields, radiation or sound can be used to excite other types of luminescence phenomena, such as electron, radio- or sonoluminescence, in or on the document. Excitation is effected by corresponding excitation devices, such as electric contacts or field plates, radiation sources for cathode rays, ion beams or x-rays, ultrasound sources or antennas.

In an alternative embodiment of the invention, it is provided that excitation light 15 emitted by particular light sources 12 is at different wavelengths or wavelength regions. Luminescence light 16 excited at different wavelengths or wavelength regions permits even more exact statements about the luminescence properties of bank note 10. It may be provided in particular that light sources 12 illuminate bank note 10 either individually or in combination, and luminescence light 16 detected with bank note 10 illuminated individually or in combination is evaluated. If illumination is first effected with only one light source 12 in the shown example of FIG. 1, then detector units 1 and 2 detect a first pair of intensity values. Upon subsequent illumination with other light source 12, a second pair of intensity values is generated. Upon simultaneous illumination with both light sources 12, a third pair of intensity values is finally obtained. Comparison and/or mathematical combination of the resulting, generally different, intensity values obtains especially exact examination of the luminescence properties of examined bank note 10.

Depending on the decay time behavior, luminescence light can be distinguished as phosphorescence or fluorescence light. The inventive apparatus or method is equally suitable for examining phosphorescence and fluorescence light.

Luminescence light 16 excited in or on bank note 10 is emitted by bank note 10 and hits two detector units 1 and 2 disposed one behind the other according to the invention so that luminescence light 16 emanating from bank note 10 successively hits individual detector units 1 and 2 and can be detected thereby. Detector units 1 and 2 each have different spectral sensitivities, so that a different spectral component of luminescence light 16 is detected in each case. Detector signals S generated by detector units 1 and 2, which are supplied to evaluation device 9 for evaluation and analysis, are accordingly different.

Optical device 13 is provided in the shown example between bank note 10 and detector devices 1 and 2 for directing, in particular focusing, luminescence light 16 emitted by bank note 10 onto detector units 1 and 2. Preferably, this is an imaging optic that images partial area 11 of bank note 10 onto detector units 1 and 2. Self-focusing lenses, so-called Selfoc lenses, are preferably used here. Self-focusing lenses are cylindrical optical elements made of material having a refractive index that decreases from the optical axis of the cylinder toward the surface thereof. The use of Selfoc lenses obtains an adjustment-free 1:1 image transfer of partial area 11 of bank note 10 to be examined onto detector units 1 and 2 independently of the distance between bank note 10 and detector units 1 and 2.

Filter 14 is disposed before detector units 1 and 2 in this example, being permeable to those partial spectral regions of luminescence light 16 which are to be detected with detection units 1 and 2.

Figure 2:
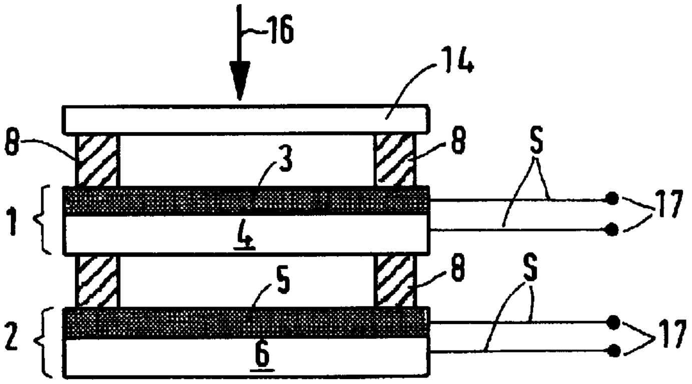
FIG. 2 shows a first embodiment of the inventively disposed detector units.

FIG. 2 shows a first embodiment of the inventively disposed detector units. The individual detector units are formed as photodiodes 1, 2 and disposed one behind the other with respect to the direction of luminescence light 16 emitted by the document. Individual photodiodes 1 and 2 each have p-n junction 3/4, 5/6 between p-type 3, 5 and n-type 4, 6 semiconductor layers. The doping profile is shown greatly simplified here and generally does not render the actual ratios of size of the layer thicknesses. Distance pieces 8 are provided between photodiodes 1 and 2 for avoiding electric shorts. To keep any parallactic errors as low as possible, the height of distance pieces 8 should not be too great, being about in the range of the height of photodiodes 1, 2. Filter 14 can optionally be disposed before photodiode 1, likewise spaced with corresponding distance pieces 8. In addition, it is possible to provide a corresponding filter (not shown) between individual photodiodes 1, 2. Voltages are tapped between the differently doped semiconductor layers 3/4, 5/6 with electric connections 17 and passed on to an evaluation unit (not shown) as detector signals S.

Figure 3A:
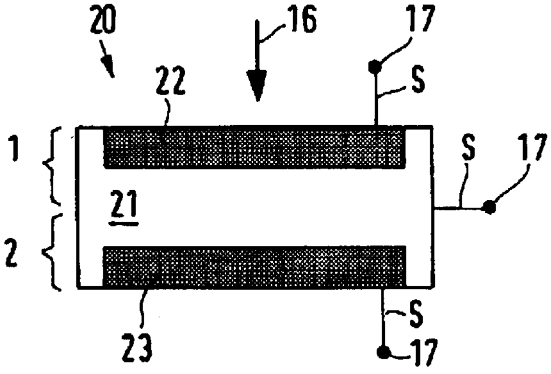
FIGS. 3*a*) and *b*) each show a second embodiment of the inventively disposed detector units.
Figure 3B:
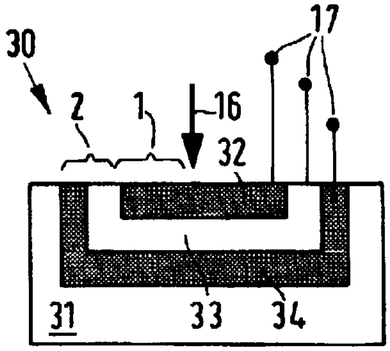

FIGS. 3*a* and 3*b* each show a second embodiment of the inventive arrangement. FIG. 3*a* shows component 20 on which detector units 1 and 2 are jointly integrated, component 20 having two p-n junctions 22/21, 23/21 corresponding to detector units 1, 2, respectively. The n-type semiconductor layer 21 forms the substrate on which the two p-n junctions 22/21, 23/21 are applied in layers. The doping profile is likewise shown greatly simplified here and generally does not render the actual ratios of size of the layer thicknesses. As in the example shown in FIG. 2, voltages are tapped with suitable connections 17 and passed on to an evaluation unit (not shown) as detector signals S.

FIG. 3*b* shows a variant of the second embodiment of the inventive arrangement. Shown component 30 includes two layered p-n junctions 32/33, 34/33 applied to common substrate 31. Substrate 31 itself can be a semiconductor or ceramic substrate. The mode of functioning of this embodiment is subject to the analogous comments on FIG. 3*a*.

Detector units 1 and 2 shown in FIGS. 2, 3*a* and 3*b* are selected so that first detector unit 1 is permeable to that partial spectral region of luminescence light 16 which which is to be detected with second detector unit 2 disposed behind first detector unit 1. Detector units 1 and 2 formed in particular as photodiodes or p-n junctions have different absorption edges, the absorption edge of first photodiode 1 or p-n junction 3/4, 32/33, 22/21 being at smaller wavelengths than the second absorption edge of second photodiode 2 or p-n junction 5/6, 34/33, 23/21 disposed behind first photodiode 1 or p-n junction 3/4, 32/33, 22/21.

In the sandwich arrangement of individual detector units 1 and 2 one on the other as shown in FIG. 2, particular p-n junctions 3/4, 5/6 are preferably realized on different semiconductor materials. For example, a photodiode based on silicon (Si) is used for first detector unit 1, and a photodiode based on germanium (Ge) for second detector unit 2. Wavelengths below about one micron can then be detected by photodiode 1 based on silicon, while wavelengths above about one micron penetrate photodiode 1 and can be detected by photodiode 2 based on germanium disposed therebehind. Analogously, photodiodes based on silicon and indium-gallium-arsenide (InGaAs) or silicon and lead sulfide (PbS) can be combined for detecting luminescence light 16 in two different partial spectral regions. In addition, it is of course possible to combine a plurality of corresponding photodiodes, e.g. of silicon, indium-gallium-arsenide and lead sulfide.

In the embodiments of the inventive arrangement shown in FIGS. 3*a* and 3*b*, the different permeability or sensitivity of detector units 1 and 2 is obtained by the selection of suitable semiconductor materials and/or corresponding doping of the particular material. Corresponding component 20, 30 can be realized for example on the basis of silicon, first p-n junction 22/21, 32/33 being especially sensitive to short-wave light through a smaller penetration depth. Long-wave light, on the other hand, can penetrate deeper into the layer system and be detected by second p-n junction 23/21, 34/33 more sensitive in the long-wave spectral region.

It is also fundamentally possible to dispose individual components 20, 30 one behind the other in accordance with the example shown in FIG. 2. With suitable selection of the semiconductor materials used, this permits luminescence light 16 to be detected in more than two partial spectral regions in simple fashion.

FIG. 4 shows an example of different spectral sensitivities E of detector units 1 and 2 shown in FIGS. 2 and 3. As indicated by the diagram, spectral sensitivity E1 of first detector unit 1 is greatest in the range of short wavelengths X, while spectral sensitivity E2 of second detector unit 2 disposed behind first detector unit 1 reaches its peak at higher wavelengths λ. The behavior of spectral permeabilities of detector units 1, 2 is complementary thereto. The spectral permeability of detector unit 1 is therefore greatest at higher wavelengths λ so that the luminescence light in this partial region of the spectrum can penetrate detector unit 1 and finally be detected by detector unit 2.

FIG. 5 shows a circuit diagram of the second embodiment shown in FIGS. 3*a*, 3*b*. Detector units 1 and 2, i.e. corresponding p-n junctions 22/21 and 23/21, 32/33 and 34/33, of component 20, 30 are shown as oppositely series-connected photodiodes whose cathodes are on common potential 18. Signals S1 and S2 are supplied to evaluation device 9 via anode outputs 19 of the photodiodes. In evaluation device 9 signals S1 and S2 are amplified logarithmically in one logarithmic amplifier 28 each and then applied to differential amplifier 29. Since the difference of two logarithmized values corresponds to the logarithm of the quotient of the two values, output voltage Ua of differential amplifier 29 is proportional to the logarithm of the quotient of the two detector signals S2/S1 and thus independent of the absolute intensity of luminescence light 16. Statements about the spectral properties, in particular color, of detected luminescence light 16 can then be derived from output voltage Ua with especially high reliability.

The spectral properties of luminescence light 16, in particular the wavelength, such as the central wavelength, and/or the wavelength region and/or the color, can be detected and analyzed according to the invention not only in the visible spectral region but also in invisible spectral regions, such as the infrared or ultraviolet.

As an alternative or in addition to the described analog evaluation, it is possible to first digitize detector signals S1 and S2 and then derive statements about the luminescence light from the digitized signals in digital, in particular computer-aided, evaluation.

What is claimed is:

1. Apparatus for examining documents, the apparatus comprising at least one excitation device arranged to excite luminescence light (16) in or on a document to be examined;

at least two detector units arranged to detect at least part of the luminescence light emitted by the document; and wherein the detector units are disposed one behind the other with respect to the luminescence light emitted by the document.

2. Apparatus according to claim 1, wherein the excitation device includes at least one light source arranged to illuminate the document with excitation light suitable for exciting luminescence light in or on the document.

3. Apparatus according to claim 2, including at least two light sources, the excitation light from the light sources being at different wavelengths or in different wavelength regions.

4. Apparatus according to claim 1, wherein the detector units have different spectral sensitivities.

5. Apparatus according to claim 1, wherein at least a first detector unit is permeable to at least a partial spectral region of the luminescence light which is also detectable by at least one of said detector units disposed behind the first detector unit.

6. Apparatus according to claim 1, wherein the detector units are formed as photodiodes.

7. Apparatus according to claim 6, including at least one optical filter disposed at least between two photodiodes.

8. Apparatus according to claim 6, wherein the photodiodes, preferably p-n junctions have different absorption edges and the first absorption edge of at least a first photodiode or at least a first p-n junction is at smaller wavelengths than the second absorption edge of at least a second photodiode disposed behind the first photodiode or at least a second p-n junction disposed behind the first p-n junction.

9. Apparatus according to claim 1, wherein the detector units are integrated on a common component.

10. Apparatus according to claim 9, wherein the component includes at least two photosensitive layers, preferably p-n junctions and a single detector unit corresponds to each photosensitive layer, preferably each p-n junction.

11. Apparatus according to claim 10, wherein the photosensitive layers, preferably p-n junctions are formed in layers and applied to a common substrate preferably a semiconductor or ceramic substrate.

12. Apparatus according to claim 11, wherein the photosensitive layers, preferably p-n junctions are disposed in layers one on the other with respect to the luminescence light emitted by a document to be examined.

13. Apparatus according to claim 10, wherein the photodiodes, preferably p-n junctions, have different absorption edges and the first absorption edge of at least a first photodiode or at least a first p-n junction is at smaller wavelengths than the second absorption edge of at least a second photodiode disposed behind the first photodiode or at least a second p-n junction disposed behind the first p-n junction.

14. Apparatus according to claim 1, including an optical device arranged to direct the luminescence light emanating from the document onto the detector units.

15. Apparatus according to claim 14, wherein the optical device includes at least one lens, preferably a self-focusing lens, arranged to focus the luminescence light emitted by the document onto the detector units.

16. Apparatus according to claim 1, including an evaluation device arranged to derive statements about the spectral properties, in particular the wavelength, of the detected luminescence light from detector signals generated by the detector units.

17. Apparatus according to claim 16, wherein the evaluation device includes a logarithmic amplifier arranged to logarithmize individual detector signals.

18. Apparatus according to claim 16, wherein the evaluation device includes a differential amplifier arranged to form the difference between two detector signals or between two logarithmized detector signals.

19. Apparatus according to claim 16, wherein the evaluation device arranged to derive statements about the spectral properties, preferably the wavelength of the detected luminescence light is formed on the basis of the division of two detector signals and/or a document to be examined is excited to emit luminescence light, and at least part of the luminescence light emitted by the document is detected by at least two detector units, wherein the luminescence light successively hits the detector units disposed one behind the other and is detected thereby.

20. A method for examining documents, for example documents of value, identification or security documents, wherein a document to be examined (10) is excited to emit luminescence light (16), and at least part of the luminescence light (16) emitted by the document (10) is detected by at least two detector units (1,2) wherein the luminescence light (16) successively hits the detector units (1,2) disposed one behind the other and is detected thereby.

21. The method according to claim 20, wherein the document is illuminated with excitation light suitable for exciting luminescence light in or on the document.

22. The method according to claim 20, wherein the luminescence light is detected by detector units having different spectral sensitivities.

23. The method according to claim 20, wherein at least a partial spectral region of the luminescence light passes through at least a first detector unit and is detected by at least a second detector unit disposed behind the first detector unit.

24. The method according to claim 20, wherein the detector units generate detector signals, and statements about the spectral properties, preferably the wavelength of the detected luminescence light are derived from the detector signals.

25. The method according to claim 24, wherein the derivation of statements about the spectral properties, preferably the wavelength of the detected luminescence light is effected on the basis of the division of two detector signals and/or the difference of two logarithmized detector signals.

* * * * *